(12) United States Patent  (10) Patent No.: US 8,707,265 B2
Li  (45) Date of Patent: *Apr. 22, 2014

(54) TEST AUTOMATION METHOD FOR SOFTWARE PROGRAMS

(75) Inventor: Chunyue Li, Chiba-Ken (JP)

(73) Assignee: SAP AG, Walldorf (DE)

(*) Notice: Subject to any disclaimer, the term of this patent is extended or adjusted under 35 U.S.C. 154(b) by 48 days.

This patent is subject to a terminal disclaimer.

(21) Appl. No.: 13/037,290

(22) Filed: Feb. 28, 2011

(65) Prior Publication Data

US 2011/0258599 A1 Oct. 20, 2011

Related U.S. Application Data

(63) Continuation of application No. 11/394,559, filed on Mar. 31, 2006, now Pat. No. 7,930,683.

(51) Int. Cl.
*G06F 9/44* (2006.01)

(52) U.S. Cl.
USPC ........... 717/124; 717/110; 717/111; 717/126; 717/135

(58) Field of Classification Search
None
See application file for complete search history.

(56) References Cited

U.S. PATENT DOCUMENTS

| 4,519,078 | A | | 5/1985 | Komonytsky |
| 4,569,048 | A | | 2/1986 | Sargent |
| 4,651,298 | A | | 3/1987 | Currier, Jr. |
| 5,379,376 | A | * | 1/1995 | Bednowitz ..................... 345/501 |
| 5,689,517 | A | * | 11/1997 | Ruparel ......................... 714/731 |
| 5,732,213 | A | | 3/1998 | Gessel et al. |
| 5,737,517 | A | | 4/1998 | Kite et al. |
| 5,774,695 | A | | 6/1998 | Autrey et al. |
| 5,787,147 | A | | 7/1998 | Gunderson |
| 5,812,780 | A | | 9/1998 | Chen et al. |
| 5,878,422 | A | * | 3/1999 | Roth et al. ............................ 1/1 |
| 5,881,381 | A | * | 3/1999 | Yamashita et al. ............ 715/209 |
| 5,937,202 | A | | 8/1999 | Crosetto |
| 5,958,074 | A | | 9/1999 | Sugimoto |
| 6,023,271 | A | * | 2/2000 | Quaeler-Bock et al. ....... 715/866 |
| 6,081,534 | A | * | 6/2000 | Sipila ............................ 370/466 |
| 6,134,515 | A | | 10/2000 | Skogby |
| 6,223,312 | B1 | | 4/2001 | Nozuyama |
| 6,223,321 | B1 | * | 4/2001 | Nasu et al. .................... 714/769 |
| 6,237,122 | B1 | * | 5/2001 | Maki ............................. 714/730 |
| 6,671,680 | B1 | * | 12/2003 | Iwamoto et al. .............. 707/737 |

(Continued)

OTHER PUBLICATIONS

Title: A real-time simulation environment of embedded computer systems software testing, author: Gafni V. et al, source: IEEE, dated Jun. 5, 1989.

(Continued)

*Primary Examiner* — Chameli Das
(74) *Attorney, Agent, or Firm* — Kenyon & Kenyon LLP

(57) ABSTRACT

A method for testing a software program creates test data by simulating data exchange messages between a server and a client and stores test data in Comma Separated Value (CSV) files. Data repository files stored in the CSV format can be edited by common tools, like a spreadsheet program, and can be maintained easily. The test automation method provides a data capturer tool so that the data repository could be created based on any existing test environment. The test automation method converts data repository files and simulates messages in order to load data to a mobile infrastructure system and set up data fixtures. The test automation method could be integrated in a build process so that data repository and test cases are validated against any program changes periodically.

19 Claims, 6 Drawing Sheets

(56) References Cited

U.S. PATENT DOCUMENTS

| | | | |
|---|---|---|---|
| 6,907,546 | B1 | 6/2005 | Haswell et al. |
| 6,986,124 | B1* | 1/2006 | Field et al. .................... 717/124 |
| 7,107,202 | B1 | 9/2006 | Hedge et al. |
| 7,319,947 | B1* | 1/2008 | Khaira et al. .................... 703/17 |
| 7,370,317 | B2 | 5/2008 | Cabrera et al. |
| 7,412,623 | B1 | 8/2008 | Lindberg |
| 7,424,416 | B1 | 9/2008 | Cavanagh et al. |
| 7,454,660 | B1* | 11/2008 | Kolb et al. .................. 714/38.14 |
| 7,490,319 | B2* | 2/2009 | Blackwell et al. ............ 717/124 |
| 7,603,658 | B2* | 10/2009 | Subramanian et al. ....... 717/126 |
| 7,613,599 | B2 | 11/2009 | Bade et al. |
| 7,899,661 | B2* | 3/2011 | Rompaey et al. .............. 703/22 |
| 7,921,137 | B2* | 4/2011 | Lieske et al. .................. 707/802 |
| 2002/0019969 | A1* | 2/2002 | Hellestrand et al. .............. 716/5 |
| 2002/0174140 | A1* | 11/2002 | Peake et al. .................... 707/500 |
| 2004/0205611 | A1* | 10/2004 | Minninger .................... 715/522 |
| 2004/0215826 | A1* | 10/2004 | Pfitzner ........................ 709/245 |
| 2004/0230559 | A1* | 11/2004 | Newman et al. .................. 707/1 |
| 2005/0027559 | A1* | 2/2005 | Rajan et al. ........................ 705/1 |
| 2005/0097515 | A1 | 5/2005 | Ribling |
| 2005/0166186 | A1 | 7/2005 | Cabera et al. |
| 2005/0193269 | A1* | 9/2005 | Haswell et al. .................. 714/38 |
| 2005/0193280 | A1* | 9/2005 | Schubert et al. ................ 714/47 |
| 2006/0036481 | A1* | 2/2006 | White .............................. 705/12 |
| 2006/0117055 | A1 | 6/2006 | Doyle |
| 2006/0205399 | A1 | 9/2006 | Jain et al. |
| 2006/0230048 | A1* | 10/2006 | Kosov et al. .................. 707/100 |
| 2006/0233121 | A1* | 10/2006 | Cooper ......................... 370/261 |
| 2006/0242087 | A1* | 10/2006 | Naehr et al. ..................... 705/68 |
| 2007/0016593 | A1* | 1/2007 | Lieske et al. .................. 707/100 |
| 2007/0061625 | A1 | 3/2007 | Acosta et al. |
| 2007/0111180 | A1* | 5/2007 | Sperle et al. .................. 434/350 |
| 2007/0122791 | A1* | 5/2007 | Sperle ........................... 434/350 |
| 2007/0136278 | A1* | 6/2007 | Grazioli et al. .................... 707/6 |
| 2007/0192079 | A1* | 8/2007 | Rompaey et al. ............... 703/19 |
| 2008/0059625 | A1* | 3/2008 | Barnett et al. ................. 709/223 |
| 2008/0267386 | A1* | 10/2008 | Cooper .................... 379/265.06 |
| 2009/0182868 | A1* | 7/2009 | McFate et al. ................. 709/224 |
| 2011/0159472 | A1* | 6/2011 | Eck et al. ....................... 434/322 |
| 2012/0271953 | A1* | 10/2012 | Gulley et al. ................. 709/226 |

OTHER PUBLICATIONS

Title: Simulation based system level fault insertion using co-verification tools, author: Eklow B et al., source: IEEE, dated: Oct. 26, 2004.

Berner, Stefan et al., "Observations and lessons learned from automated testing." in proceedings of the 27th International Conference on software engineering (ICSE .5)., May 15-21, 2005., St. Louis Missouri, USA, pp. 571-579.

Malian, John and Eklow, Bill, "Embedded Testing in an In-Circuit Test Environment", Lecture 4.2 of the International Test Conference, pp. 1-6, Dated: 2008.

* cited by examiner

TEST AUTOMATION METHOD FOR SOFTWARE PROGRAMS

CROSS-REFERENCE TO RELATED APPLICATIONS

This application is a continuation of and claims priority to U.S. patent application Ser. No. 11/394,559 to Chunyue Li, filed on Mar. 31, 2006 now U.S. Pat. No. 7,930,683, entitled "A Test Automation Method for Software Programs" and which is herein incorporated by reference in its entirety.

BACKGROUND

Proper test automation can improve software quality and efficiency of software development. A test program usually includes many test cases, which are tested on some test fixtures. A test fixture is a determined running background of a known set of objects and states.

One difficulty found for test automation for a mobile infrastructure based solution is to set up test fixtures. A mobile infrastructure based solution usually contains three parts: the server side, the client side, and the middle part which includes mobile infrastructure middleware and client framework for exchanging data between the server and the client.

One approach to solving this problem is to avoid test fixtures, and design test cases working with all sets of data. This might work for testing some simple logic. But it does not work or will involve significant efforts to create test cases for complex logic, e.g., an inventory handling with different unit of measurements, which requires significant programming of complex test logic to create data irrelevant test cases.

Another approach is to isolate data persistence by creating mock objects. This could be achieved by implementing interfaces over the data persistence layer or business logic layer, and creating and returning mock objects without touching underlying mobile infrastructure data persistence. The disadvantages of this approach include that: it needs significant programming of application specific mock objects to simulate test fixtures, it is not general across applications, data generating logics are not separated from test cases, and test environment is very different from real environment, etc.

A further approach is to set up data fixtures at the server side and then download them to the client side. However, the complexity and huge data/customizing dependencies on the server side make it difficult to set up and reproduce fixed data set for client unit test purpose. In addition, in the case of server change or migration, test cases may be broken.

However, one problem for setting up test fixtures from the client side is the authority to create data from the client side. Mobile infrastructure contains a data persistence and synchronization framework to synchronize data between a client and a server. The data persistence and synchronization framework has a data meta definition to define the table and field structure on the client side. In order to prevent unintended operations by application programs, the data meta definition can restrict the authority to create, modify or delete data in data tables from the client side. For example, data in the material master table is not allowed to be created from the client side. This authority restriction, although a good design practice, makes it impossible for a test automation program to create test data freely using normal program interfaces provided by mobile infrastructure.

Further, data exchange messages between the server and the client are in XML format, which contains information like table name, actions, record ID, data record field values, etc. However, it is difficult to maintain data in the XML format. For example, it would be difficult, without spending large efforts on developing a proprietary tool, to perform the following common maintenance tasks on data in the XML format:

1) To have an overview list of all records, sorted by certain fields.

2) To apply changes to the same field of all records, e.g., applying a fixed value, or incremental values.

3) When an application program is upgraded, data model may need to be enhanced, e.g., additional fields are required to be added to a table for new functions. In such a data model enhancement during application migration, it would cost significant efforts to maintain test data in XML format.

The mobile infrastructure test layer is a unit test layer for testing mobile infrastructure, not for testing applications based on mobile infrastructure. Its test focus is network functionality and protocol correctness, instead of correctness of application logic. Test data is maintained in raw messages in XML format, and significant efforts are required for data maintenance. Additionally, there is no data capture concept or end-to-end integrated build process concept in the mobile infrastructure test layer.

Thus, it would be desirable to provide a test automation method which is applicable to mobile infrastructure based applications, and all other software programs as well.

DETAILED DESCRIPTION OF EMBODIMENTS

Embodiments of the present invention provide a method and system to create test data by simulating data exchange messages between the server and the client and stores test data in Comma Separated Value (CSV) files. In further embodiments, data repository files stored in the CSV format can be edited by common tools, for example, a spreadsheet program, and can be maintained easily. In addition, the CSV format itself is suitable for migration. A good migration of data model design is backward compatible, which means keeping existing fields unchanged and appending new fields if any, so that test cases created in lower versions of an application program can be used in higher versions of the application program. In further embodiments, the present invention provides a test automation method. The test automation method and system provides a data capturer tool so that data repository may be created based on any existing test environment. The test automation method also converts data repository files and simulates messages in order to load data to a mobile infrastructure system and set up data fixtures. The test automation method further provides a build process so that data repository and test cases may be validated against any program changes periodically.

Figure 1:
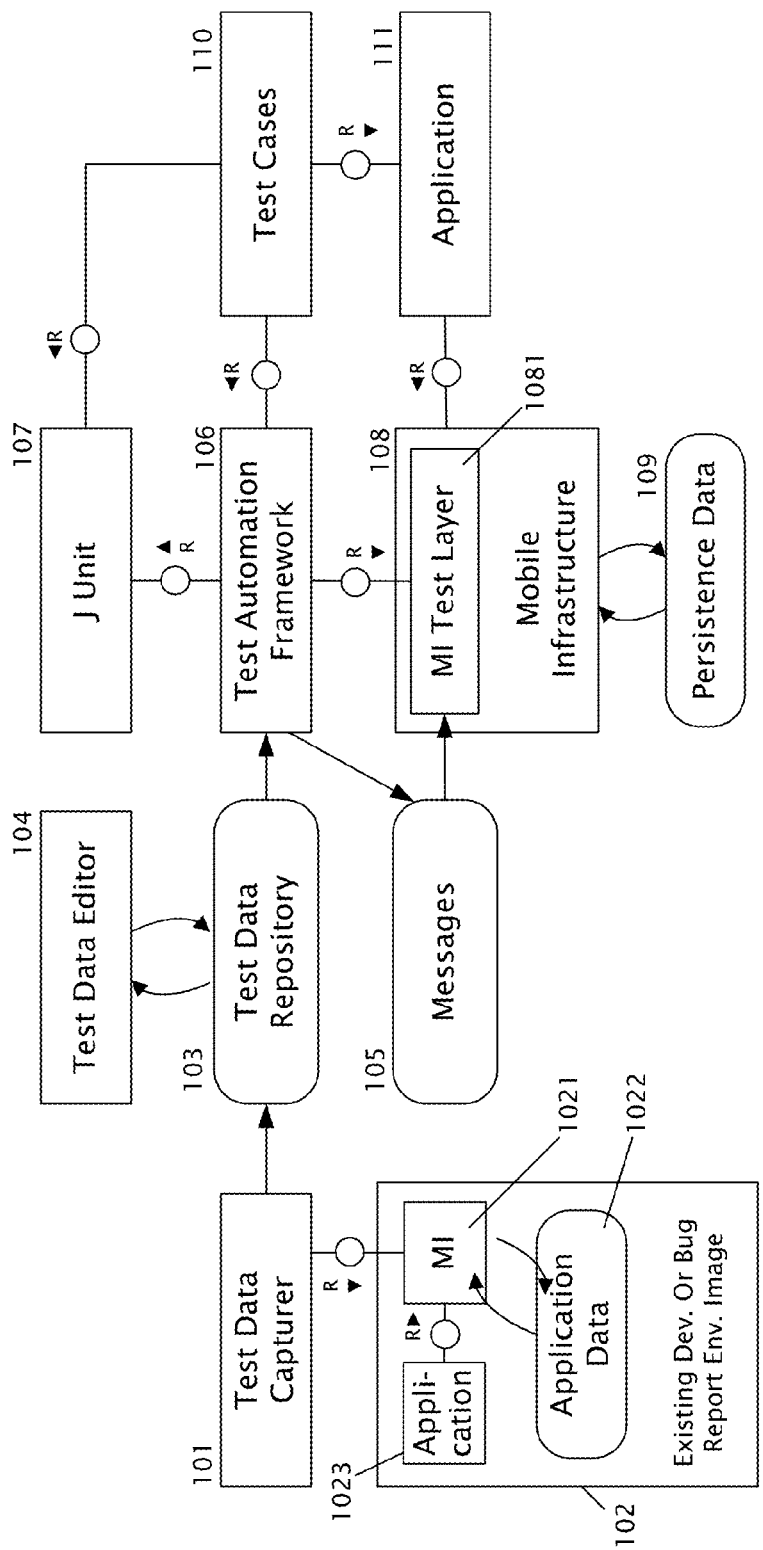
FIG. 1 illustrates an architecture of a test automation method according to an embodiment of the present invention.

FIG. 1 illustrates an architecture of a test automation method according to an embodiment of the present invention. In this embodiment, the test automation method is used for unit testing of the client side of mobile infrastructure based applications. For example, Mobile Direct Store Delivery (DSD) 2.0 SR2 from SAP™. The test automation method of the present invention is applicable to all types of software programs.

A test data capturer at 101 could record data of an existing application environment at 102, for example, a downloaded development data image, or a bug report data image. The test data capturer reads application data 1022 of the existing application environment through APIs of a mobile infrastructure MI 1021, and exports data in CSV files to a test data repository at 103. It should be understood that other data format which could be easily maintained could also be used. An application 1023 could request for the application data 1022 through the mobile infrastructure MI 1021 too.

The test data capturer of the present invention is application independent. In a further embodiment, the test data capturer can be delivered as an add-on to the mobile infrastructure. Once applied, the test data capturer can help capture application test environment by accessing mobile infrastructure menus.

Data in the test data repository can later be used by a test automation framework at box 108 for testing. In a further embodiment, the data is used in periodical build process.

Test data is stored in CSV files in the test data repository at 103. A test environment is represented by a set of CSV files, each of which represents one Synchronize Business Object (SyncBO) or a child table of a SyncBO. SyncBO is a concept in mobile infrastructure, and is used to synchronize data between a server an a client. For example, in a test environment, DSD_DELIV represents a delivery SyncBO, 010 is its child table for delivery items, and totally two CSV files are needed.

Data in the test data repository can be maintained by a test data editor at 104. The CSV format is useful for test automation because it can be maintained easily as a table sheet by commercially available tools, such as Excel™ from Microsoft™, Lotus 1-2-3™ from IBM™. Data in CSV format can also be displayed in a grid table, sorted by different fields, etc. In further embodiments, changes can be applied to same column of different records.

A test data CSV file stored in the test data repository according to one embodiment of the present invention is shown in Table 1. As shown, a simplified set of sample material test data is sorted by MAT_NO field. The CSV file, or the SyncBO, has five fields: PARENT_KEY, SYNC_KEY, MAT_NO, MAT_DESC1, and MAT_TYPE.

TABLE 1

| PARENT_KEY | SYNC_KEY | MAT_NO | MAT_DESC1 | MAT_TYPE |
|---|---|---|---|---|
| | 4825971 | CP_10099 | BIER 1 * 20 L PPAS (BATCHMAT) | FERT |
| | 4825980 | CP_10100 | BIER 1 * 20 L | FERT |
| | 4825889 | CP_10101 | BEER BLOND KEG 1 * 20,00 L | FERT |
| | 4825996 | CP_10102 | CHICKEN BREAST 3 | FERT |
| | 4826005 | CP_10103 | BEER LIGHT KEG 1 * 20,00 L | FERT |
| | 4826013 | CP_10104 | CHICKEN BREAST | FERT |

As shown in Table 1, the SyncBO has six records. The SYNC_KEY field needs to be unique for each record in the test data repository. This can be achieved by defining a SYNC_KEY number range for each SyncBO or implementing special logic to regenerate SYNC_KEY in the test framework.

Not all fields of a table (SyncBO or child table of a SyncBO) need to be maintained in a test data CSV file. The order of the fields is not important either, except that the PARENT_KEY field, which is used to link a top SyncBO and its child items in another table, should always be in the first column of a table. The PARENT_KEY field contains the SYNC_KEY field value of the parent record to be linked. For a top record which has no parent, this field should be left empty. Thus, a test data CVS file can maintain only a subset of columns of a table (SyncBO or child table of a SyncBO), which are relevant for test cases.

In the case of a data model enhancement in application version migration, the present invention allows additional fields to be added to tables easily, thus enabling test data and test cases in old versions of an application program to work with new versions of the application program without changes. The compatibility can reduce the cost of maintaining test data and test cases in application migration.

In addition, a user can add comments to any columns which do not belong to a SyncBO, for example, by adding marks to the last column of a record indicating that the record's special values are being used by a test case and should not be changed, as shown in Table 2 below.

TABLE 2

| PARENT_KEY | SYNC_KEY | TOUR_ID | CHECK_ID | ITM_NO | INV_TYPE | MAT_NO | UOM | ROTRUCK | PLAN_QTY | ACT_QTY | Comments |
|---|---|---|---|---|---|---|---|---|---|---|---|
| 4852341 | 4852342 | S0000005146 | 1 | 10 | 1 | MDSD_00001 | ST | | 3 | 3 | Do not |
| 4852341 | 4852343 | S0000005146 | 1 | 20 | 1 | MDSD_00002 | ST | | 3 | 3 | change. |
| 4852341 | 4852344 | S0000005146 | 1 | 30 | 1 | MDSD_00003 | ST | | 3 | 3 | |
| 4852341 | 4852345 | S0000005146 | 1 | 40 | 1 | MDSD_00004 | ST | | 3 | 3 | |
| 4852341 | 4852346 | S0000005146 | 1 | 50 | 1 | MDSD_00005 | ST | | 3 | 3 | |
| 4852341 | 4852347 | S0000005146 | 1 | 60 | 1 | MDSD_00006 | ST | | 3 | 3 | |
| 4852341 | 4852348 | S0000005146 | 1 | 70 | 1 | MDSD_00007 | ST | | 3 | 3 | |

TABLE 2-continued

| PARENT_KEY | SYNC_KEY | TOUR_ID | CHECK_ID | ITM_NO | INV_TYPE | MAT_NO | UOM | ROTRU CK | PLAN_QTY | ACT_QTY | Comments |
|---|---|---|---|---|---|---|---|---|---|---|---|
| 4852341 | 4852349 | S0000005146 | 1 | 80 | 1 | MDSD_00008 | ST | | 3 | 3 | |
| 4852341 | 4852350 | S0000005146 | 1 | 90 | 1 | MDSD_00009 | ST | | 3 | 3 | |
| 4852341 | 4852351 | S0000005146 | 1 | 100 | 1 | MDSD_00010 | ST | | 3 | 3 | |
| 4852341 | 4852352 | S0000005146 | 1 | 110 | 1 | MDSD_00011 | ST | | 3 | 3 | |
| 4852341 | 4852353 | S0000005146 | 1 | 120 | 1 | MDSD_00012 | ST | | 3 | 3 | |
| 4852341 | 4852354 | S0000005146 | 1 | 130 | 1 | MDSD_00013 | ST | | 3 | 3 | |
| 4852341 | 4852355 | S0000005146 | 1 | 140 | 1 | MDSD_00014 | ST | | 3 | 3 | |
| 4852341 | 4852356 | S0000005146 | 1 | 150 | 1 | MDSD_00015 | ST | | 3 | 3 | |

A test automation framework at 106 utilizes JUnit at 107 as base framework to facilitate test case and test suite management. The test automation framework accesses a mobile infrastructure 108 through a mobile Infrastructure (MI) test layer 1081. The test automation framework reads CSV files from the test data repository at 103, and generates simulation messages at 105. The simulation messages are sent to the MI test layer 1081 to trigger message processing with the mobile infrastructure 108.

The test automation framework 106 could have logic to support test data maintained in a subset of columns of a table. This increases test data and test case compatibility in the case of test data model migration and reduces maintenance cost.

Different from the existing application environment at 102 used for data preparation, the mobile infrastructure at 108 represents the currently running environment.

In an embodiment, the mobile infrastructure 108 further has a user interface simulator, so that a user can not only automate test with the data repository, but also debug using the underlying data repository like a usual mobile infrastructure application with user interfaces.

Persistence data at 109 represents data stored on a mobile device by the mobile infrastructure 108, and could be accessed by the mobile infrastructure.

Test cases 110 are created for each to-be-tested application 111, utilizing the JUnit at 107, the test automation framework at 106, and the to-be-tested application at 111. In one embodiment, the test cases are JAVA™ files.

Figure 2:
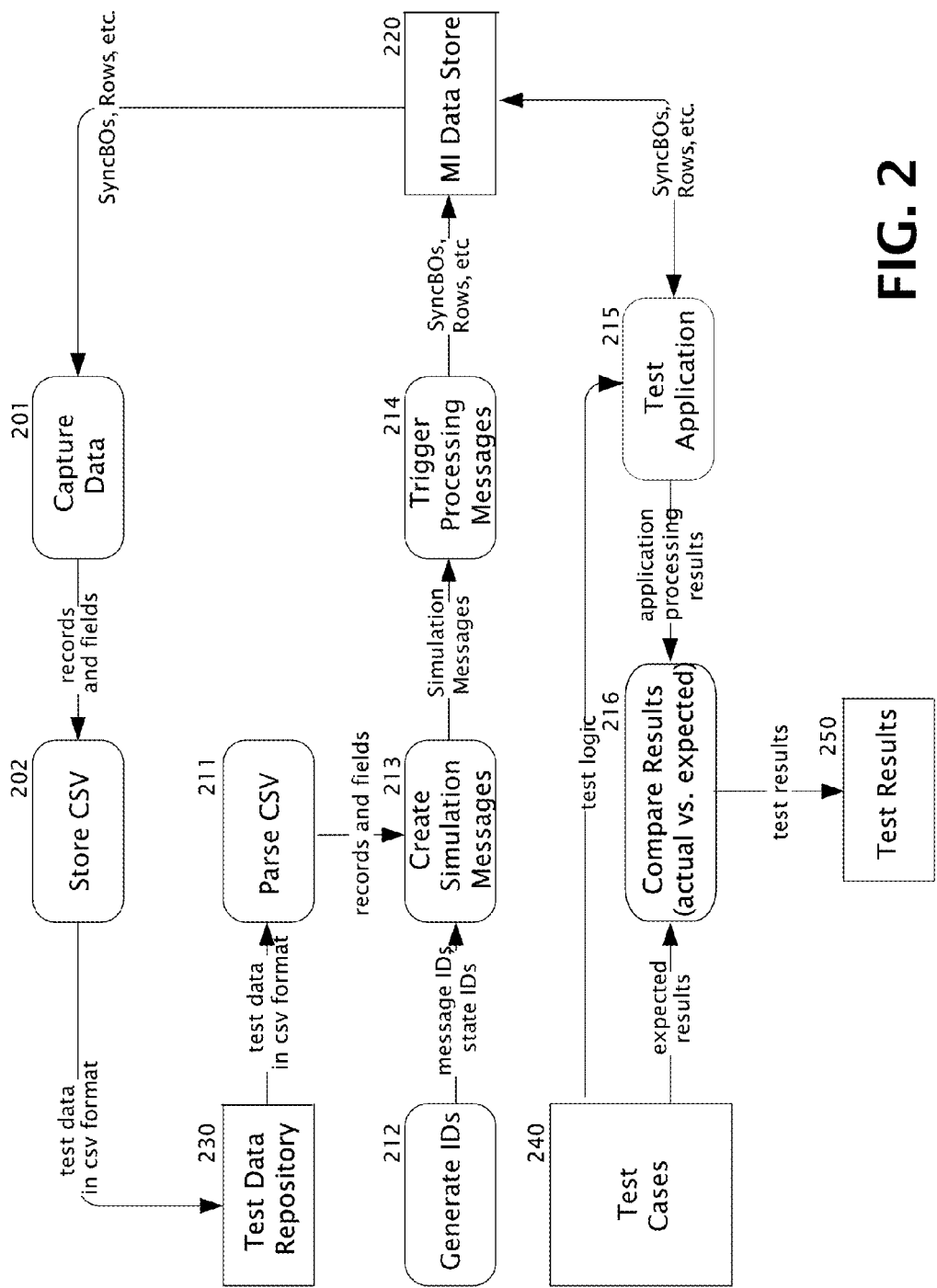
FIG. 2 illustrates a data flowchart of a test automation method according to an embodiment of the present invention.

FIG. 2 shows a data flowchart of a test automation method according to an embodiment of the present invention.

The data flow chart in FIG. 2 covers both the data capture phase and the automated test phase of the present invention. In the data capture phase, at 201, MI data stored in a MI data store at 220 in SyncBO and row format is retrieved. At 202, the captured data in record and field format is converted into CSV format and stored in a test data repository at 230 in CSV format, as shown in FIG. 2.

In the automated test phase, at 211, test data in CSV format from the test data repository at 230 is parsed and converted into records and fields format, as shown in FIG. 2. At 212, dummy message IDs and state IDs are generated. At 213, simulation messages are created from parsed data in record and field format and the generated IDs in order to simulate data exchange messages between a mobile device and mobile infrastructure. At 214, simulation messages sent to the mobile infrastructure trigger the processing of the mobile infrastructure to generate test data, which is in SyncBO and row format and is sent to the MI data store at 220.

At 215, the application to be tested retrieves the test data from the MI data store 220 in SyncBO and row format and performs test application logic according to requirements defined in test cases from 240. At 216, actual results from 215 and expected results from 240 are compared and the resulting test results are stored in 250.

Figure 3A:
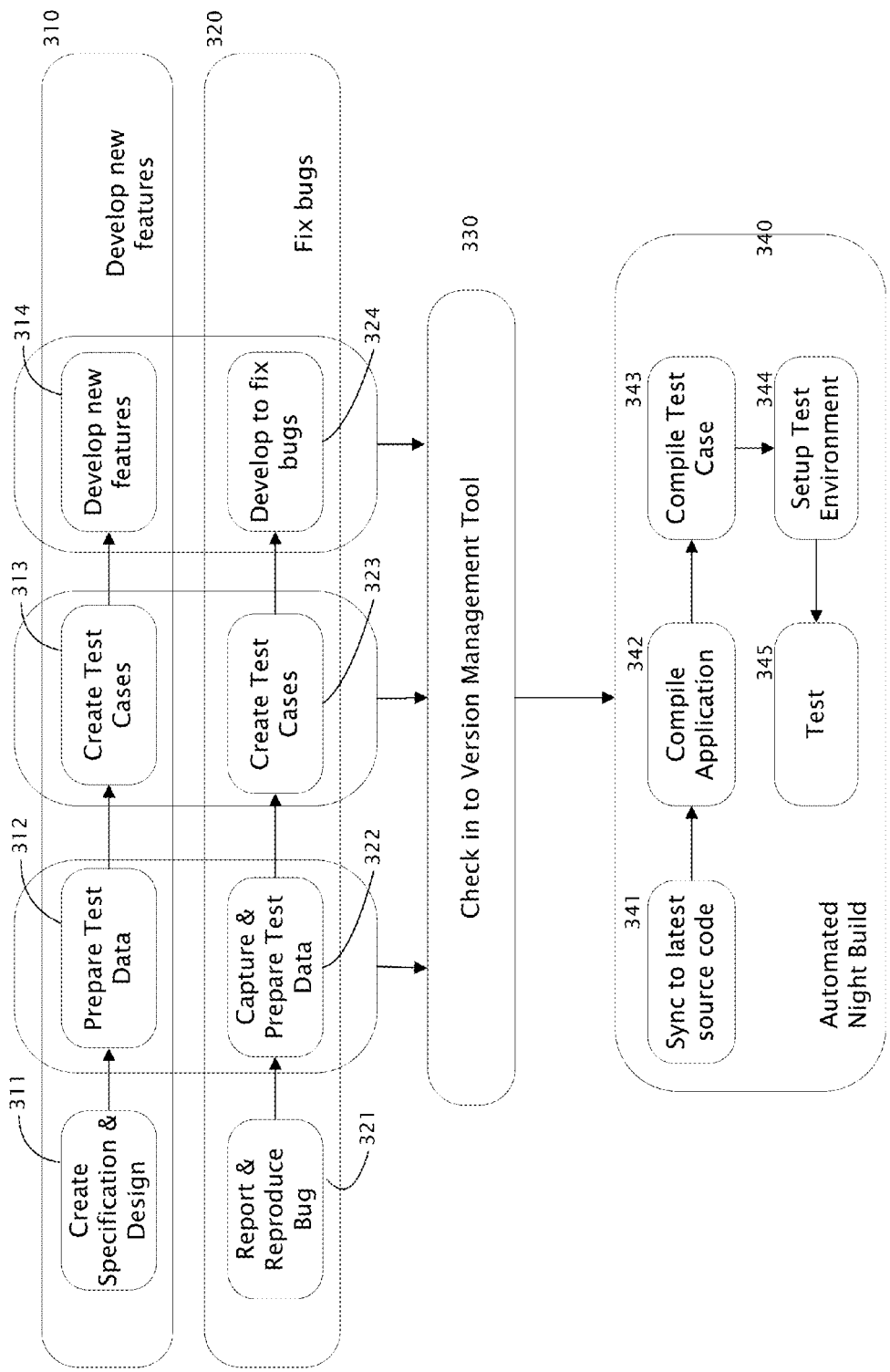
FIG. 3A illustrates a flowchart of a test automation method according to an embodiment of the present invention.

FIG. 3A shows a flow chart of a test automation method according to one embodiment of the present invention. In this embodiment, the test automation method is integrated in a daily build process, and data repository and test cases are validated against any program changes every day. The test automation method of the present invention could be integrated in other build processes which trigger tests regularly.

Box 310 is for new features to be tested. The specification and design are created at 311, and test data are prepared at 312. If the existing test data repository is not enough to test new features, at 312, the test data repository is expanded or a complete new test data repository is created by either manually maintaining test data in grid tables or capturing necessary new test data. As discussed above, test data in the present invention is stored in CSV files in the test data repository and could be maintained easily.

At 313, test cases are created based on the specification, design and test data, so that the correctness of implementations can be verified. Then new features are developed at box until they pass all test cases.

Box 320 is for fixing bugs. When a bug is reported, either from a customer or an internal tester, at 321, the problem is reproduced either on a set of development data or a data image sent by the reporter. The test data set is captured at 322. The reproduced test data set can either be merged into an existing test data repository by adding fields to end of CSV files, or be used to create a new test data repository. At 323, test cases are created based on the test data and the expected correct behavior so that a correction of the bug can be verified. At 324, a bug fix is developed until it passes all test cases.

Once a new feature or a bug fix is completed and locally tested with predefined test cases, the test data repository in CSV files, test cases and source code of the development for the new feature or the bug fix can be checked into a centralized version management tool, at 330.

In an embodiment, the test automation method of the present invention is integrated in a night build process. The night build process is triggered every night and automatically synchronizes, at step 341, all checked-in up-to-date files from the version management tool to a build server. As described above, the checked-in up-to-date files from the version management tool at 330 include test data repository, test cases and application source code.

In an embodiment, application source code and test cases are compiled to binary format at 342 and 343. A temporary runtime test environment could be built on the build server 340 at 344. Test cases are executed at 345. Any newly checked in changes are verified with these test cases.

If any of the automated tests is failed, the night build process will be stopped and a notification email will be sent to the registered mail list so that development team will know this test failure. A detailed test result will also be available on the build server for diagnosing purposes.

An example of using the method of the present invention to test a DSD application is described below. It should be understood that the method and system of the present invention could be easily applied to other applications.

1. Setting Up the Environment.

The folder structure is shown below in Table 3.

TABLE 3

| JAVA ™ | JAVA ™ Source Codes |
|---|---|
| +com.sap.ip.me | Workaround MI source code for MI 2.5 SP13 |
| +com.sap.mbs.test | General test tools across applications |
| +data | Message simulation, data capturer, etc. data related tools |
| +setup | General test setup classes |
| +util | Utility classes |
| +com.sap. test | Application specific test tools and test entry classes: Main, Debug, etc |
| +setup | Application specific setup classes |
| +(component) | Component specific test cases |
| setup | Data setup related files |
| +app | Application level meta and configuration, etc. |
| +data | Data repositories |

In embodiments of the present invention, a test project for an application to be tested, e.g., DSD, is set up in an eclipse (or import application jar file) first. Libraries shown in Table 4 are used for setting up the test project:

TABLE 4

| Library Name | Version | Where to Get |
|---|---|---|
| ME.jar | MI 2.5 SP13 | Perforce lib folder |
| db2ejdbc.jar | 8.2 | Perforce lib folder |
| MITest.jar | After MI 2.5 SP13 | Perforce lib folder |
| crimson.jar | Shipped with MI 2.5 SP13 | Perforce lib folder |
| jaxp.jar | Shipped with MI 2.5 SP13 | Perforce lib folder |
| xalan.jar | Shipped with MI 2.5 SP13 | Perforce lib folder |
| junit.jar | 3.7 for JDK 1.3<br>3.8.1 for JDK 1.4 | Perforce lib folder (3.7)<br>http://www.junit.org/ |

Setting up steps for the eclipse include:

synchronizing to head version of source code in a perforce_test folder;

creating a new project in the eclipse, wherein the project home is _test folder;

adding "JAVA"™ and "setup" folders to source;

importing all library files mentioned above; and linking the project or add an application jar file.

Figure 3B:
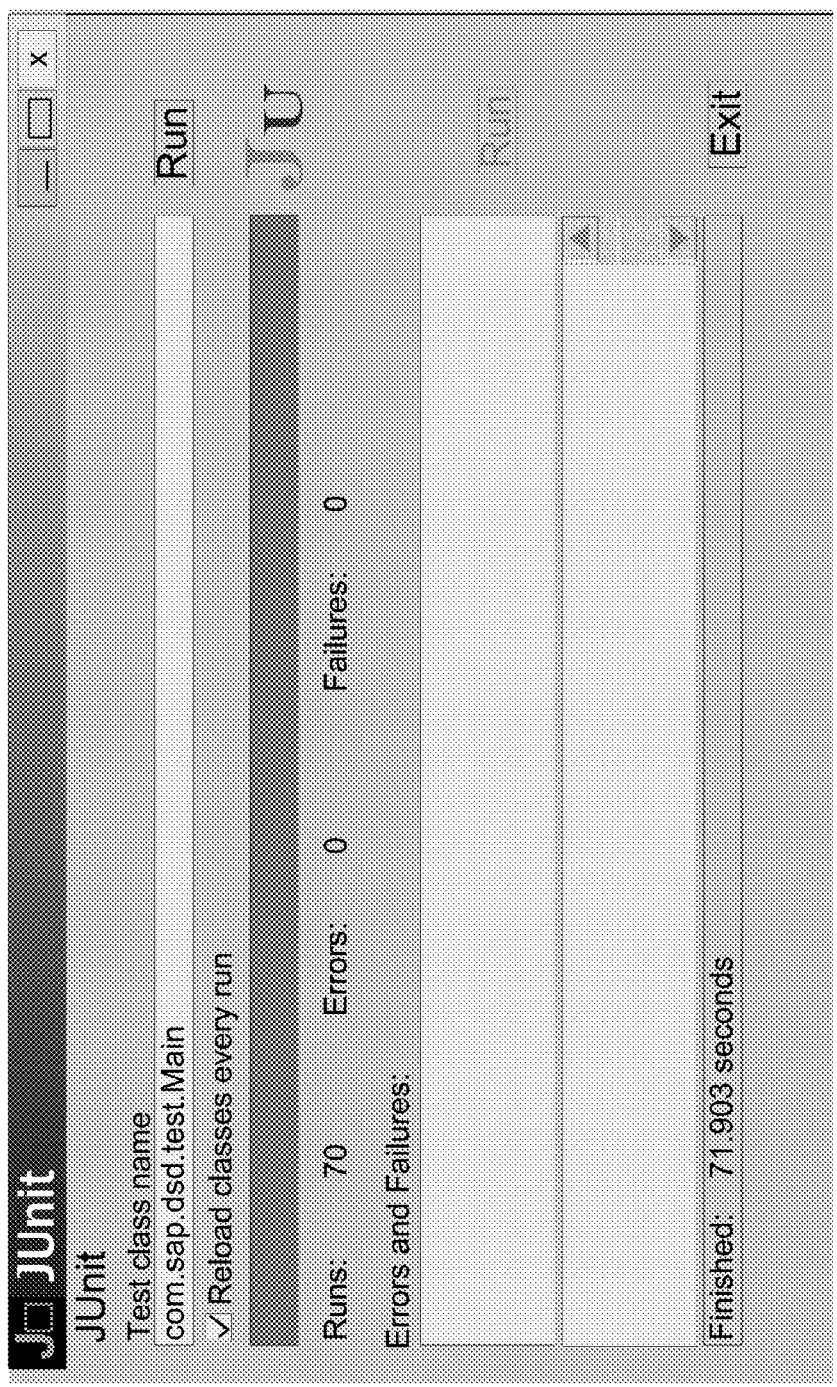
FIG. 3B illustrates a screenshot of a root test according to one embodiment of the present invention.

Then the root test (which contains all other tests) is run by program junit.awtui.TestRunner with the test class name as parameter, as shown in FIG. 3B.

Next, a JUnit 3.7 jar file is copied to ant/lib folder to setup an ant.

To run from the ant, an application jar file (e.g., go to _core/cfg folder, ant makeJar) is built, and test cases are built. The test then begins. Ant will provide an overview report on the total number of tests run, number of failures, etc. A more detailed report could be saved as TEST-testclassname.txt file.

2. Prepare Test Data

As discussed above, data repository files in the present invention are in CSV format and Excel could be used to edit the test data. However, Excel will automatically format every cell to "general" format not "text" format for CSV files and this will cause missing of leading zeros. To avoid the leading zero issue of Excel, file suffixes could be changed to "csv1".

A user can use OpenCSVMacro.xls to open and save data repository files to avoid leading zero issues. The procedure could be:

open OpenCSVMacro.xls files, and select "enable Macros";

to open a data repository file, run macro "OpenMacro" or press CTRL-o;

to save a data repository file, run macro "SaveMacro" or press CTRL-s;

check that the file saved is in appropriate CSV format.

Test data could also be prepared by capturing data from an existing environment. The procedure could be:

deploy MBSTest.zip as an add-on to a device, or manually add MBSTest.zip to lib folder and listOfjar.txt file;

after data capture add-on is deployed, data can be captured by clicking OK on the About Dialog of mobile infrastructure any time after the application is started;

a timestamp folder will be created under the root folder and data repository files are generated under that folder.

3. Create Test Cases

Figure 4:
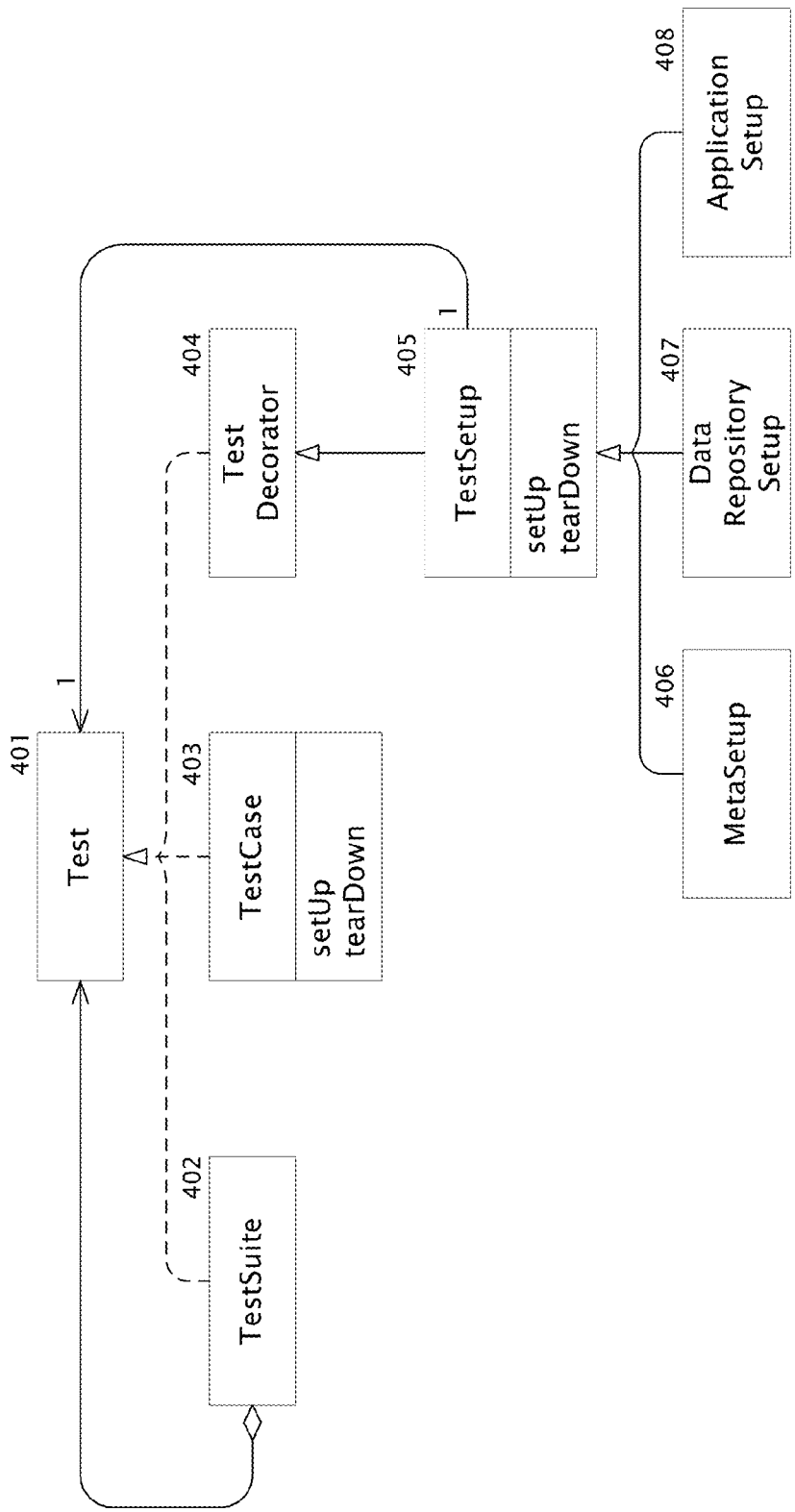
FIG. 4 illustrates an exemplary class relationship among JUnit classes used to create test cases.

JUnit could be used to manage test cases and test suites in the test automation method of the present invention. FIG. 4 shows a example of class relationship among JUnit classes used to create test cases. For the sake of brevity, only classes relevant to the test automation method of the present invention are shown, with classes for implementation details omitted.

JUnit classes Test 401, TestSuite 402, TestCase 403, TestDecorator 404 and TestSetup 405 use composite and decorator design patterns, which make it possible to create very flexible structure of test cases and sets of test cases and to apply setup fixtures for test cases and sets of test cases. In these JUnit classes, the Testsuit class 402 is composed of many Tests, which can be TestCases or even TestSuites; and the TestSetup class 405 can decorate a Test, which can be a TestCase, a TestSuite or another TestSetup.

A MetaSetup class 406 loads data model meta, such as definition of database or SyncBO. A DataRepositorySetup class 407 loads a data repository. An application setup 408 is used to initialize and activate application. The procedure runs the MetaSetup class 406, the DataRepositorySetup class 407 and the application setup 408, and then runs the Testsetup 405 before each test.

Figure 5:
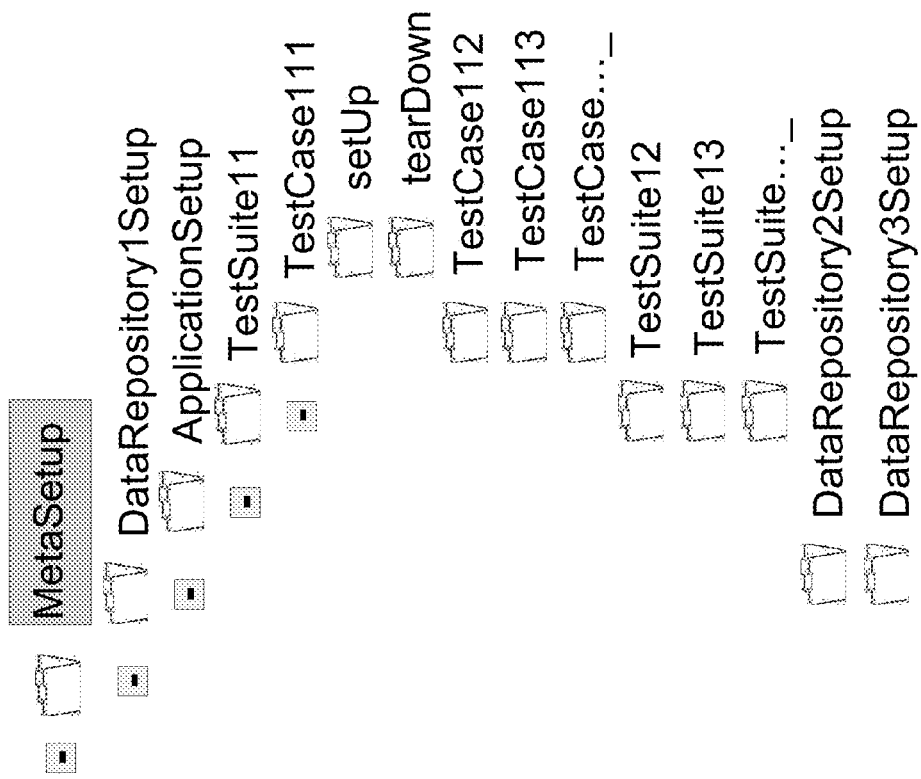
FIG. 5 illustrates an exemplary organization of test cases according to an embodiment of the present application.

FIG. 5 shows an exemplary organization of test cases according to an embodiment of the present application. The test case structure may be very flexible, because composite and decorator patterns are used.

The execution sequence of the test cases shown in FIG. 5 is as follows:

```
- MataSetup.setUp( )
- DataRepository1Setup.setUp( )
- ApplicationSetup.setUp( )
- TestCase111.setUp( )
- TestCase111.test...( )
- TestCase111.test...( )
......
- TestCase111.tearDown( )
- TestCase112 ......
......
- DataRepository1Setup.tearDown( )
- DataRepository2Setup......
......
- MetaSetup.tearDown( )
```

While the invention has been described in detail above with reference to some embodiments, variations within the scope and spirit of the invention will be apparent to those of ordinary skill in the art. For example, although embodiments are described with reference to a computer, other electrical device could be used.

What is claimed is:

1. A computer implemented method for testing a mobile infrastructure based software program, comprising:
    obtaining test data representing a pre-existing application environment, the test data being in a first format;
    performing test logic for the software program with the obtained test data according to at least one requirement defined in at least one test case;
    comparing results from performing the test logic with expected results;
    storing results of the comparison;
    converting the test data from the first format into a second format and storing the test data in a test data repository;
    modifying the test data stored in the test data repository while in the second format, wherein the modifying comprises adding additional fields to the test data and the modified test data in the second format is compatible with subsequent versions of the software program;
    converting the modified test data from the test data repository from the second format to the first format; and
    creating simulation messages with the converted test data in the first format to simulate data exchange messages between a mobile device and mobile infrastructure.

2. The method of claim 1, wherein the second format is Comma Separated Value (CSV) format.

3. The method of claim 1, wherein the test data in the test data repository is edited with a data editing program.

4. The method of claim 1, further comprising processing the simulation message by the mobile infrastructure to create test data in the first format and sending the created test data to a data store.

5. The method of claim 1, wherein the test data representing the pre-existing application environment is from a mobile infrastructure data store.

6. The method of claim 1, wherein the test data representing the pre-existing application environment is captured by an add-on delivered to the mobile infrastructure.

7. The method of claim 1, further comprising checking the software program, the test data repository and the at least one test case into a version management tool on a regular basis.

8. The method of claim 7, wherein the software program, the test data repository and the at least one test case are checked into the version management tool daily.

9. The method of claim 7, wherein the software program is for a new feature.

10. The method of claim 7, wherein the software program is used to fix a bug.

11. The method of claim 7, further comprising synchronize newly checked in source code of the software program to the source code of the software program in the version management tool.

12. The method of claim 7, further comprising testing an up-to-date software program with an up-to-date test data repository and an up-to-date test case.

13. The method of claim 1, wherein the first format is Synchronized Business Object format.

14. A system for testing a mobile infrastructure based software program, comprising:
    a test data capturer stored in a computer for capturing test data representing a pre-existing application environment in a first format, converting the test data from the first format to a second format, and exporting the captured test data in the second format;
    a test data repository for storing in a computer test data from the test data capturer in the second format;
    a test data editor for editing the test data stored in the test data repository while in the second format, wherein the editing comprises adding additional fields to the test data while in the second format and the modified test data in the second format is compatible with subsequent versions of the software program; and
    a test automation controller for creating a simulation message to simulate a data exchange message between a mobile device and the mobile infrastructure and to trigger procession of the mobile infrastructure to generate the test data in the first format representing the pre-existing application environment.

15. The system of claim 14, wherein the test data editor is a non-proprietary tool.

16. The system of claim 14, wherein the second format is Comma Separated Value (CSV) format.

17. The system of claim 14, wherein the test automation controller accesses data stored in the test data repository.

18. The system of claim 14, further comprising a test case generator which communicates with the test automation controller and generates a test case for the software program.

19. A computer implemented method for testing a mobile infrastructure based software program, comprising:
    creating a simulation message to simulate a data exchange message between a mobile device and the mobile infrastructure;
    triggering processing of the mobile infrastructure by the simulation message to generate test data representing a pre-existing application environment, the test data being in a first format;
    converting the test data in the first format into a second format and storing the test data while in the second format;
    modifying the data stored in the test data repository while in the second format, wherein the modifying comprises adding additional fields to the test data and the modified test data in the second format is compatible with subsequent versions of the software program;
    converting the modified data from the second format to the first format; and
    testing the software program with the converted data in the first format to create real time running test data in the first format.

* * * * *